Patented May 9, 1933

1,908,369

UNITED STATES PATENT OFFICE

MAX ALBERT KUNZ, OF MANNHEIM, AND KARL KOEBERLE, OF LUDWIGSHAFEN-ON-THE-RHINE, GERMANY, ASSIGNORS TO GENERAL ANILINE WORKS, INC., OF NEW YORK, N. Y., A CORPORATION OF DELAWARE

DERIVATIVES OF DIBENZANTHRONES

No Drawing. Application filed December 26, 1929, Serial No. 416,760, and in Germany December 29, 1928.

The present invention relates to the production of derivatives of the dibenzanthrone and isodibenzanthrone series.

We have found that dyestuffs of the dibenzanthrone and isodibenzanthrone series which in part are new are obtained by condensing dibenzanthrones which term when used in the following description and the appended claims is meant to comprise isodibenzanthrones, containing one or several negative substituents, such as halogens or nitro groups, with amides of mononuclear aromatic acids, such as for example carboxylic and sulphonic acids in which one hydrogen atom of the amino group may be replaced by an alkyl group of low molecular weight, such as for example a methyl, ethyl or propyl group. The acylamines of dibenzanthrones thus obtainable may be saponified by the usual methods if desired and in this manner mono and poly amino compounds of the dibenzanthrone or isodibenzanthrone series are obtained which are partly inaccessible or only accessible with difficulty by any other method, and which possess all the characteristic properties of amines of this kind and are therefore also valuable intermediate products for the manufacture of new dyestuffs.

The condensation of these mononuclear aromatic acid amides or imides with the negatively substituted dibenzanthrones is preferably carried out in solvents or diluents of high boiling point and in the presence of condensing catalysts and acid-binding agents. Solvents which may be employed are for example nitrobenzene, halogen-benzenes, naphthalene, nitro- and halogen-naphthalenes. As catalysts there may be mentioned metals and their compounds, in particular copper and its compounds. The acid formed during the reaction may be wholly or partially neutralized by the addition of hydroxides or alkaline compounds of the alkali and alkaline earth metals. The dyestuffs which are, generally speaking, obtained in very good yields dye the vegetable fibre in the most varied shades from vats which are usually more or less violet blue in color. The color of the solutions in sulphuric acid is usually violet with the products of the dibenzanthrone series and green with the products of the isodibenzanthrone series. Those dyestuffs obtained according to our invention as contain at least two acylamino radicles of the said kind are new. Particularly valuable products are those containing two benzamide radicles.

The crude dyestuffs may be purified if desired by the usual methods of purification, for example by crystallization, by purification by way of their oxonium salts which may be effected by dissolving the crude dyestuffs in concentrated sulphuric acid, precipitating by the addition of water the oxonium sulphate and decomposing the latter, or by treatment of pastes of the same with oxidizing agents, for example the aqueous paste with sodium hypochlorite.

The following examples will further illustrate the nature of this invention but the invention is not restricted to these examples. The parts are by weight.

*Example 1*

124 parts of dibromodibenzanthrone obtainable by the action of bromine on dibenzanthrone in chlorosulphonic acid in the presence of a metallic catalyst, are boiled while stirring in 2500 parts of nitrobenzene together with 150 parts of sodium acetate, 25 parts of copper oxide and 200 parts of benzamide until the reaction product is practically free from halogen. The whole is then allowed to cool and the reaction product is filtered off by suction or is separated from the solvent by distillation, if necessary with steam and under reduced pressure. The inorganic constituents are dissolved out with water or dilute acid and the dyestuff is then dried. If it is desired to bring the dyestuff into paste form by dissolving in sulphuric acid, the separation of the inorganic constituents may be combined with this operation. The dyestuff which probably corresponds to the formula

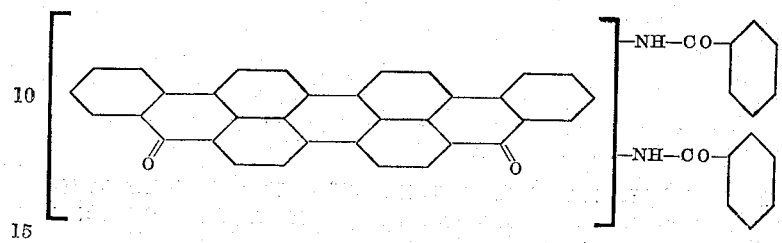

is a blue black paste, and when dry is a blue powder. It dissolves in concentrated sulphuric acid giving a violet coloration and dyes cotton from a blue vat powerful greenish marine blue shades of excellent fastness.

By saponification, for example with sulphuric acid at elevated temperatures, diaminodibenzanthrone is obtained which may be employed both as a dyestuff and as a valuable intermediate product for the manufacture of new dyestuffs.

*Example 2*

62 parts of the dibromodibenzanthrone described in Example 1 are boiled while stirring in 1000 parts of nitrobenzene after the addition of 70 parts of sodium carbonate, 15 parts of copper oxide and 50 parts of metamethoxybenzamide until the reaction product is practically free from halogen. The whole is then allowed to cool and is worked up as described in Example 1. The dyestuff obtained which probably corresponds to the formula

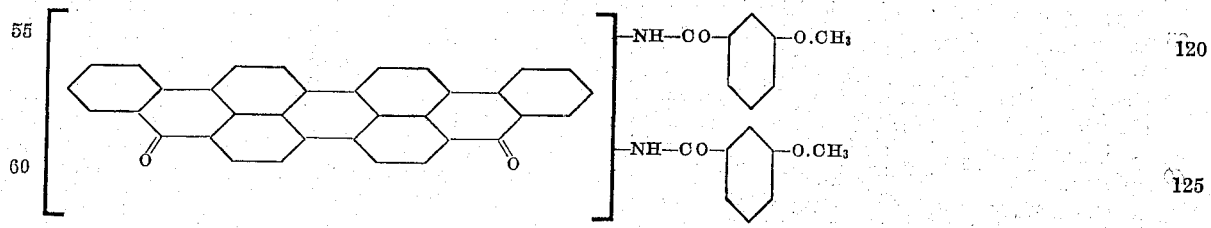

is a blue black powder, dissolves in concentrated sulphuric acid giving a violet coloration and dyes cotton from a blue vat shades which are more bluish marine blue than those of the dyestuff obtained in Example 1.

*Example 3*

85 parts of tetrabromodichloroisodibenzanthrone obtainable by acting on isodibenzanthrone with bromine in chlorosulphonic acid at between 65° and 70° C. with the aid of a metalloid as halogenating catalyst, are boiled while stirring and passing in dry air in 1000 parts of nitrobenzene together with 100 parts of potassium carbonate, 25 parts of copper acetate and 100 parts of benzamide, until a sample taken out yields dark blue dyeings on cotton. The whole is then allowed to cool and is worked up in the usual manner. The dyestuff which probably corresponds to the formula

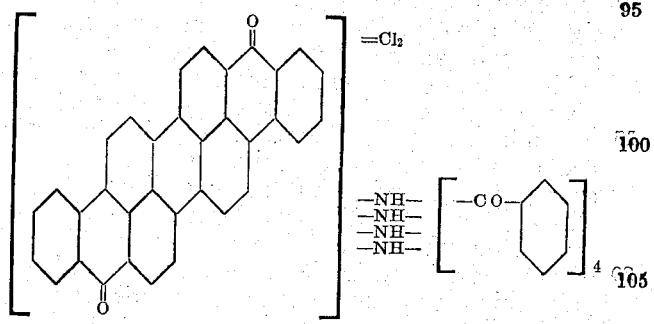

is obtained in the form of a blue black powder, dissolves in concentrated sulphuric acid giving a green coloration and gives extremely fast dark blue dyeings on cotton from a blue vat.

In a similar manner a dark blue dyeing condensation product which yields diaminoisodibenzanthrone when saponified is obtained from dibromoisodibenzanthrone and paratoluene-sulphamide.

What we claim is:—
1. A process of producing derivatives of dibenzanthrones which comprises condens- ing a dibenzanthrone containing a substituent selected from the group consisting of halogen and the nitro group with an amide of a mononuclear aromatic acid in which one hydrogen atom of the amino group may be replaced by an alkyl radicle of low molecular weight.

2. A process of producing derivatives of dibenzanthrones which comprises condensing a dibenzanthrone containing a substituent selected from the group consisting of halogen and the nitro group with an amide of a mononuclear aromatic acid in an organic solvent.

3. A process of producing derivatives of dibenzanthrones which comprises condensing a dibenzanthrone containing a substituent selected from the group consisting of halogen and the nitro group with an amide of a mononuclear aromatic acid in an organic solvent and in the presence of a condensing catalyst.

4. A process of producing derivatives of dibenzanthrones which comprises condensing a dibenzanthrone containing a substituent selected from the group consisting of halogen and the nitro group with an amide of a mononuclear aromatic acid in an organic solvent and in the presence of a condensing catalyst and an acid-binding agent.

5. A process of producing derivatives of dibenzanthrones which comprises condensing a dibezanthrone containing two halogen atoms with so much of an amide of a mononuclear aromatic acid as is sufficient to replace both halogen atoms.

6. A process of producing derivatives of dibenzanthrones which comprises condensing a dibenzanthrone containing a substituent selected from the group consisting of halogen and the nitro group with an amide of a mononuclear aromatic acid in which one hydrogen atom of the amino group may be replaced by an alkyl radicle of low molecular weight and subjecting the product obtained to saponification.

7. A process of producing derivatives of dibenzanthrones which comprises condensing a dibenzanthrone containing a halogen atom with an amide of a mononuclear aromatic acid in which one hydrogen atom of the amino group may be replaced by an alkyl radicle of low molecular weight.

8. A process of producing derivatives of dibenzanthrones which comprises condensing a dibenzanthrone containing a halogen atom with an amide of a mononuclear aromatic acid in an organic solvent and in the presence of a condensing catalyst and of an acid-binding agent.

9. A process of producing derivatives of dibenzanthrones which comprises condensing a dibenzanthrone containing a halogen atom with an amide of a mononuclear aromatic acid, in which one hydrogen atom of the amino group may be replaced by an alkyl radicle of low molecular weight, and subjecting the product obtained to saponification.

10. Dibenzanthrone derivatives containing at least two amino groups in which one hydrogen atom of each amino group is replaced by a radicle of a mononuclear aromatic acid and in which the other hydrogen atoms of the said amino groups may be replaced by an alkyl group of low molecular weight.

11. Dibenzanthrone derivatives containing two amino groups in which one hydrogen atom of each amino group is replaced by a radicle of a mononuclear aromatic acid and in which the other hydrogen atoms of the said amino groups may be replaced by an alkyl group of low molecular weight.

12. Dibenzanthrone derivatives corresponding to the formula:

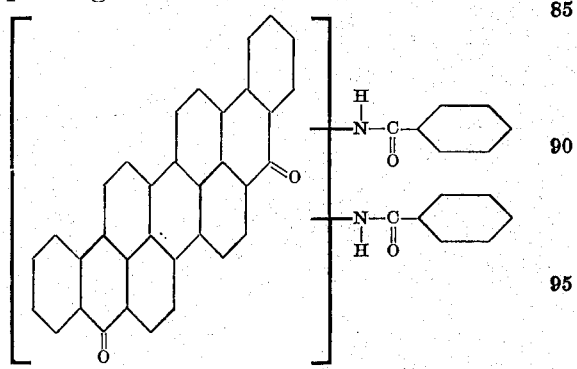

in which the dibenzanthrone radicle and the phenyl radicles may further be substituted, the said derivatives dissolving in concentrated sulphuric acid to give violet solutions and dyeing cotton greenish blue to navy blue shades from blue to violet vats.

13. The dibenzanthrone derivative corresponding to the formula:

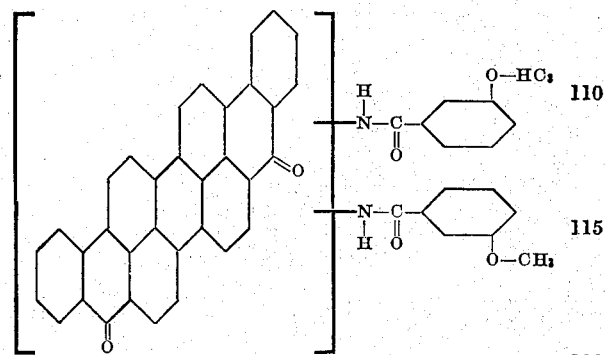

dissolving in concentrated sulphuric acid to give a violet solution and dyeing cotton from a blue vat marine blue shades.

In testimony whereof we have hereunto set our hands.

MAX ALBERT KUNZ.
KARL KOEBERLE.